(12) United States Patent
Lamgaday

(10) Patent No.: US 9,533,534 B2
(45) Date of Patent: *Jan. 3, 2017

(54) AIR MAINTENANCE TIRE AND VALVE ASSEMBLY AND METHOD

(71) Applicant: The Goodyear Tire & Rubber Company, Akron, OH (US)

(72) Inventor: Robin Lamgaday, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/520,729

(22) Filed: Oct. 22, 2014

(65) Prior Publication Data
US 2016/0114635 A1    Apr. 28, 2016

(51) Int. Cl.
*B60C 23/12* (2006.01)
*B60C 23/00* (2006.01)

(52) U.S. Cl.
CPC ............. *B60C 23/12* (2013.01); *B60C 23/004* (2013.01)

(58) Field of Classification Search
CPC ........ B60C 23/12; B60C 23/10; B60C 23/004; B60C 29/00; B60C 29/002; B60C 29/005; B60C 29/02; B60C 29/04
USPC ................................................ 152/419–427
See application file for complete search history.

(56) References Cited

U.S. PATENT DOCUMENTS

| | | |
|---|---|---|
| 3,533,060 A | 10/1970 | Aker |
| 6,499,343 B1 | 12/2002 | Haas et al. |
| 6,581,449 B1 | 6/2003 | Brown et al. |
| 6,772,812 B1 | 8/2004 | Hamilton |
| 7,234,485 B2 | 6/2007 | Yamamoto et al. |
| 7,285,868 B2 | 10/2007 | Wilson |
| 7,408,453 B2 | 8/2008 | Breed |
| 7,478,554 B2 | 1/2009 | Roth et al. |
| 8,042,586 B2 | 10/2011 | Losey et al. |
| 8,113,254 B2 | 2/2012 | Benedict |
| 8,146,413 B1 | 4/2012 | Grace |

(Continued)

FOREIGN PATENT DOCUMENTS

| | | |
|---|---|---|
| DE | 91910 C | 11/1896 |
| EP | 1908612 A1 | 4/2008 |
| EP | 2868497 A1 | 5/2015 |

OTHER PUBLICATIONS

European Search Report dated Feb. 25, 2016 for Application Serial No. EP15189408.
Machine translation of DE94910 dated Nov. 21, 1896.

*Primary Examiner* — Jason Bellinger
(74) *Attorney, Agent, or Firm* — Robert N. Lipcsik

(57) ABSTRACT

An air maintenance tire assembly includes a tire having a tire cavity to a tire tread region, a pressure control assembly attached to an elongate valve stem projecting from a rim, the pressure control assembly being external to the tire cavity, the elongate valve stem projecting outward from the tire cavity and operative to admit pressurized air into the tire cavity through the pressure control assembly, the first sidewall having an elongate sidewall air passageway therein operatively located to compress segment by segment from an expanded diameter to a substantially reduced diameter responsive to a bending strain introduced into the first sidewall from a rolling tire footprint thereby forcing air, segment by segment, along the air passageway, and a connecting tube connected to the air passageway and the pressure control assembly.

12 Claims, 17 Drawing Sheets

(56) References Cited

U.S. PATENT DOCUMENTS

| | | | |
|---|---|---|---|
| 8,573,270 B2 * | 11/2013 | Hinque | B60C 23/12 152/419 |
| 8,807,182 B2 | 8/2014 | Kelly | |
| 8,820,369 B2 * | 9/2014 | Hinque | B60C 23/12 152/45 |
| 9,272,586 B2 * | 3/2016 | Durr | B60C 23/12 152/426 |
| 2002/0134428 A1 | 9/2002 | Gabelmann | |

* cited by examiner

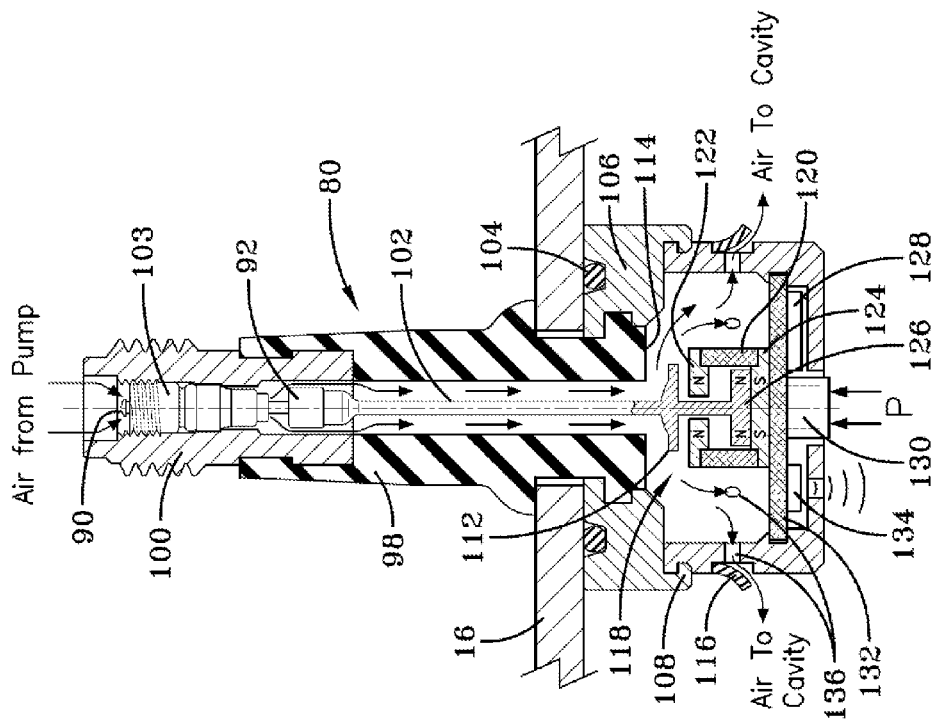
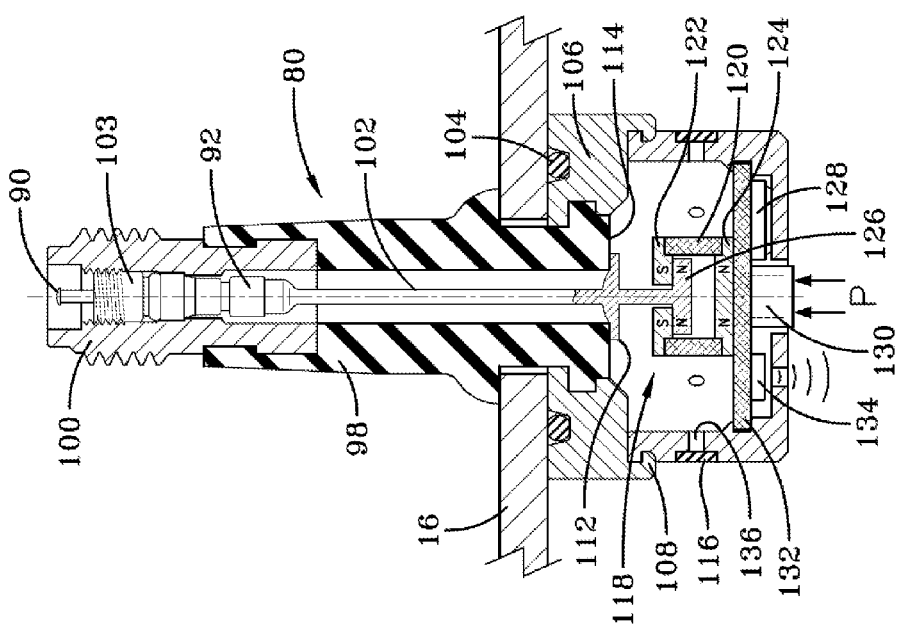
FIG 12A
FIG 12B

AIR MAINTENANCE TIRE AND VALVE ASSEMBLY AND METHOD

FIELD OF THE INVENTION

The present invention relates generally to air maintenance tires and, more specifically, to a tire assembly incorporating an air pumping mechanism into a tire for maintaining tire air pressure.

BACKGROUND OF THE PRESENT INVENTION

Normal air diffusion reduces tire pressure over time. The natural state of tires is underinflated. Accordingly, drivers must repeatedly act to maintain tire pressures or will incur reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

An air maintenance tire assembly in accordance with the present invention includes a tire having a tire cavity bounded by first and second sidewalls extending to a tire tread region, a pressure control assembly attached to an elongate valve stem projecting from a rim, the pressure control assembly being external to the tire cavity, the elongate valve stem projecting outward from the tire cavity and operative to admit pressurized air into the tire cavity through the pressure control assembly, the first sidewall having an elongate sidewall air passageway therein operatively located to compress segment by segment from an expanded diameter to a substantially reduced diameter responsive to a bending strain introduced into the first sidewall from a rolling tire footprint thereby forcing air, segment by segment, along the air passageway, and a connecting tube connected to the air passageway and the pressure control assembly, the connecting tube operative to sequentially direct air forced along the air passageway, first, into the pressure control assembly and, then, into the elongate valve stem as the tire rolls over a ground surface.

According to another aspect of the assembly, the pressure control assembly includes a valve housing threadedly attached to the elongate valve stem.

According to still another aspect of the assembly, the pressure control assembly includes a relief valve for relieving pressure in the valve housing above a set pressure.

According to yet another aspect of the assembly, the connecting tube is coupled in air flow communication with the air passageway and the valve stem.

According to still another aspect of the assembly, a first valve means enables and disables a flow of pressurized air into the connecting tube from the air passageway.

According to yet another aspect of the assembly, the first valve means comprises a one-way valve housed within a transfer housing, the transfer housing coupling the connecting tube with the air passageway.

According to still another aspect of the assembly, a second valve means comprises the pressure control assembly and the elongate valve stem.

According to yet another aspect of the assembly, the air passageway and sidewall groove are substantially annular and reside within the first sidewall proximate to the valve stem.

According to still another aspect of the assembly, the pressure control assembly opens responsive to an air pressure within the tire cavity falling below the set pressure and closes responsive to air pressure within the valve housing at or above the set pressure.

According to yet another aspect of the assembly, the relief valve opens at pressures above a recommended inflation pressure of the tire.

A method in accordance with the present invention maintains air within a tire. The method includes the steps of: positioning within a sidewall an elongate air passageway, the tire having an elongate valve stem projecting outward from a tire cavity; locating the air passageway operative to compress, segment by segment, from an expanded diameter to a substantially reduced diameter responsive to a bending strain introduced into a sidewall from a rolling tire footprint of the tire thereby forcing air, segment by segment, along the air passageway; and extending a connecting tube between the air passageway and a pressure control assembly threadedly attached to the valve stem, the connecting tube operative to sequentially direct air forced along the air passageway, first, into the pressure control assembly and then the valve stem and tire cavity as the tire rolls over a ground surface.

According to another aspect of the method, a further the step is deploying the air passageway as an elongate air tube within a groove formed within the sidewall.

According to still another aspect of the method, further steps are positioning a first valve means operative to enable and disable a flow of pressurized air into the connecting tube from the air passageway and positioning a second valve means operative to enable and disable a flow of pressurized air from the second valve means into the tire cavity.

According to yet another aspect of the method, further steps are deploying the air tube and the sidewall groove in a substantially annular configuration and positioning the air tube and the sidewall groove within the sidewall proximate to the valve stem.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane (CP).

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 12A is an enlarged section view of the AMT (air maintenance tire) valve stem regulator within the tire cavity showing the electroactive polymer disk in un-charged position and the pressure sensor receiving a low pressure signal.

FIG. 12B is an enlarged section view showing the electroactive polymer of FIG. 12A in a charged position pulling the core rod downward and allowing air flow to the tire cavity.

DESCRIPTION OF EXAMPLES OF THE PRESENT INVENTION

Figure 9:
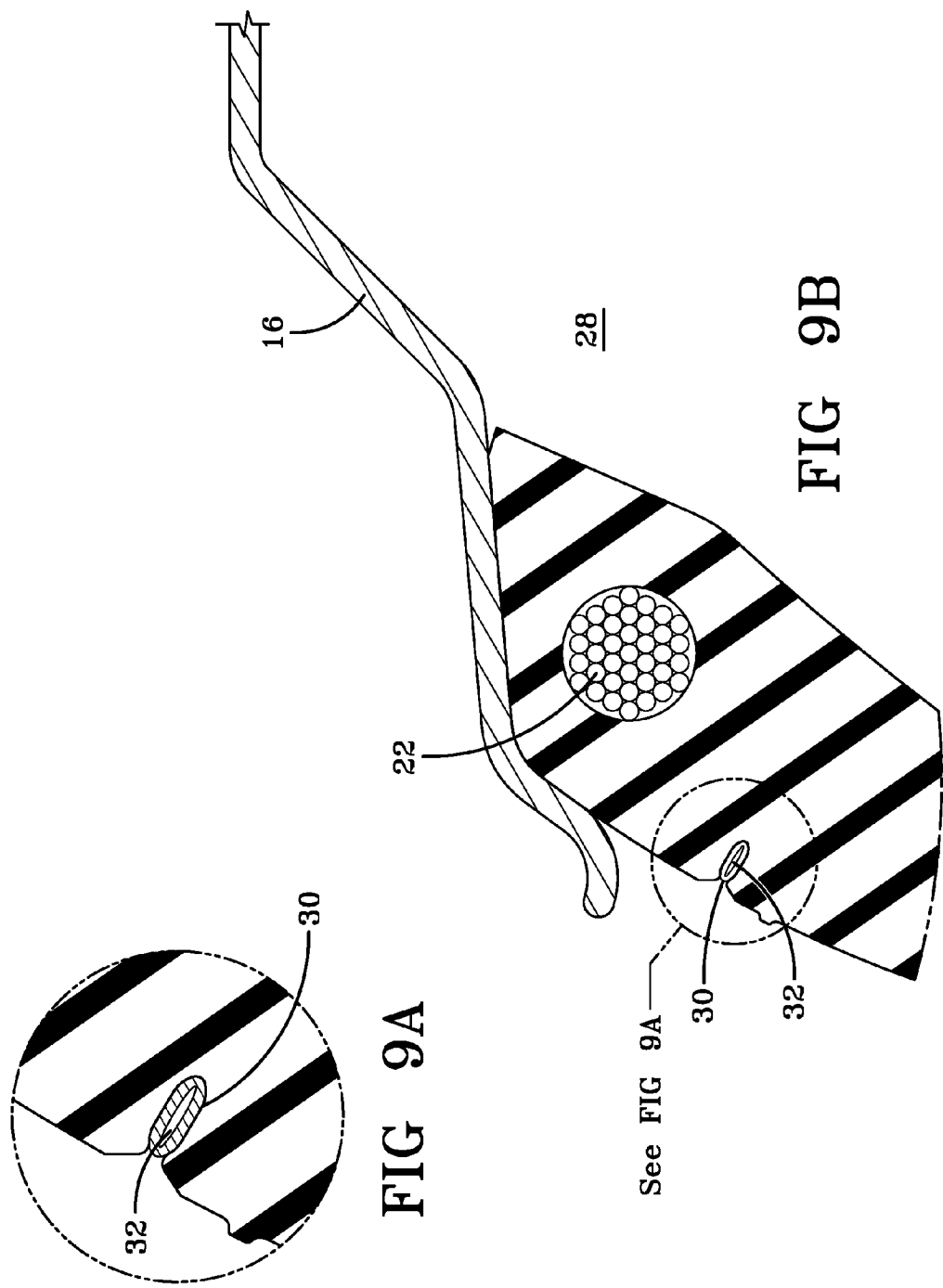
FIG. 9A is an enlarged fragmentary section view taken from FIG. 9B of the tire/rim/bead area showing pump tube location.
FIG. 9B is an enlarged view of the pump tube located in a groove opening taken from FIG. 2.

Referring to FIGS. 1, 2, 3 and 4, an example tire assembly 10 may include a tire 12, a peristaltic pump assembly 14 and a tire rim 16. The tire 12 may mount in conventional fashion to the rim 16. The tire 12 may be of conventional construction, having a pair of sidewalls 18 (only sidewall 18 being shown) extending from opposite bead areas 22, 24 (only bead area 22 being shown) to a crown or tire tread region 26. The tire 12 and rim 16 may enclose a tire cavity 28 (see FIG. 9B).

Figure 1:
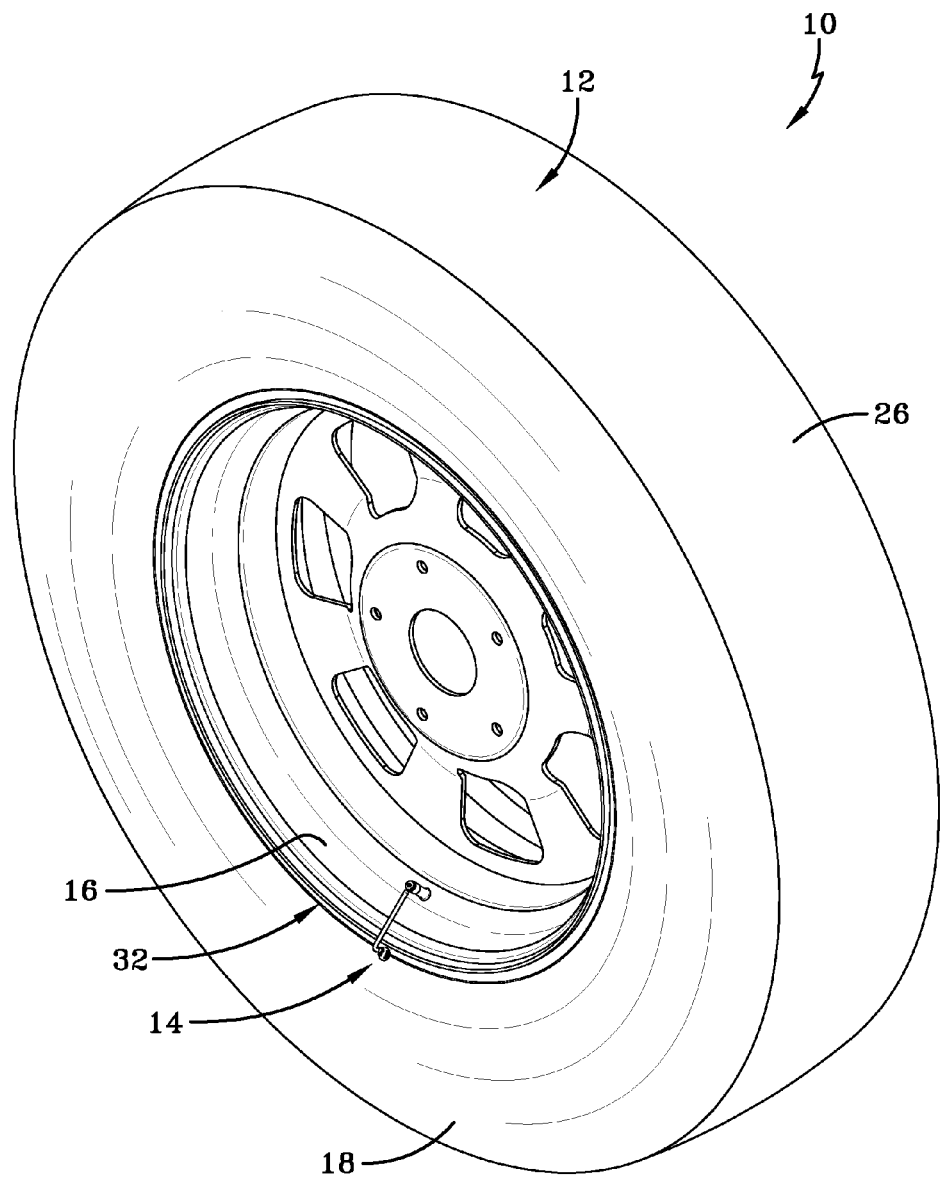
FIG. 1 is a perspective view showing a tire, tube, and pump location for use with the present invention.
Figure 2:
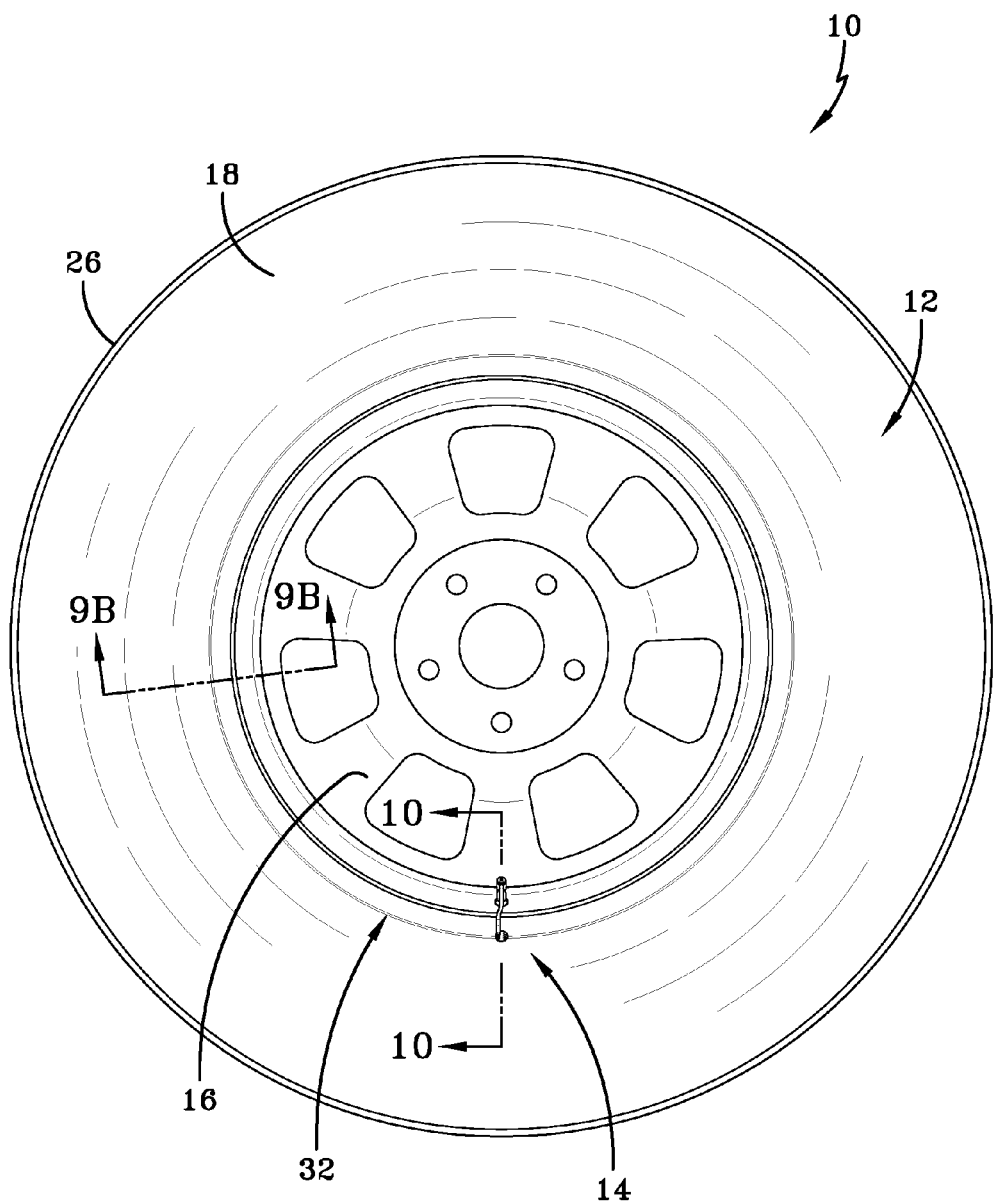
FIG. 2 is a side view of the tire of FIG. 1.
Figure 3:
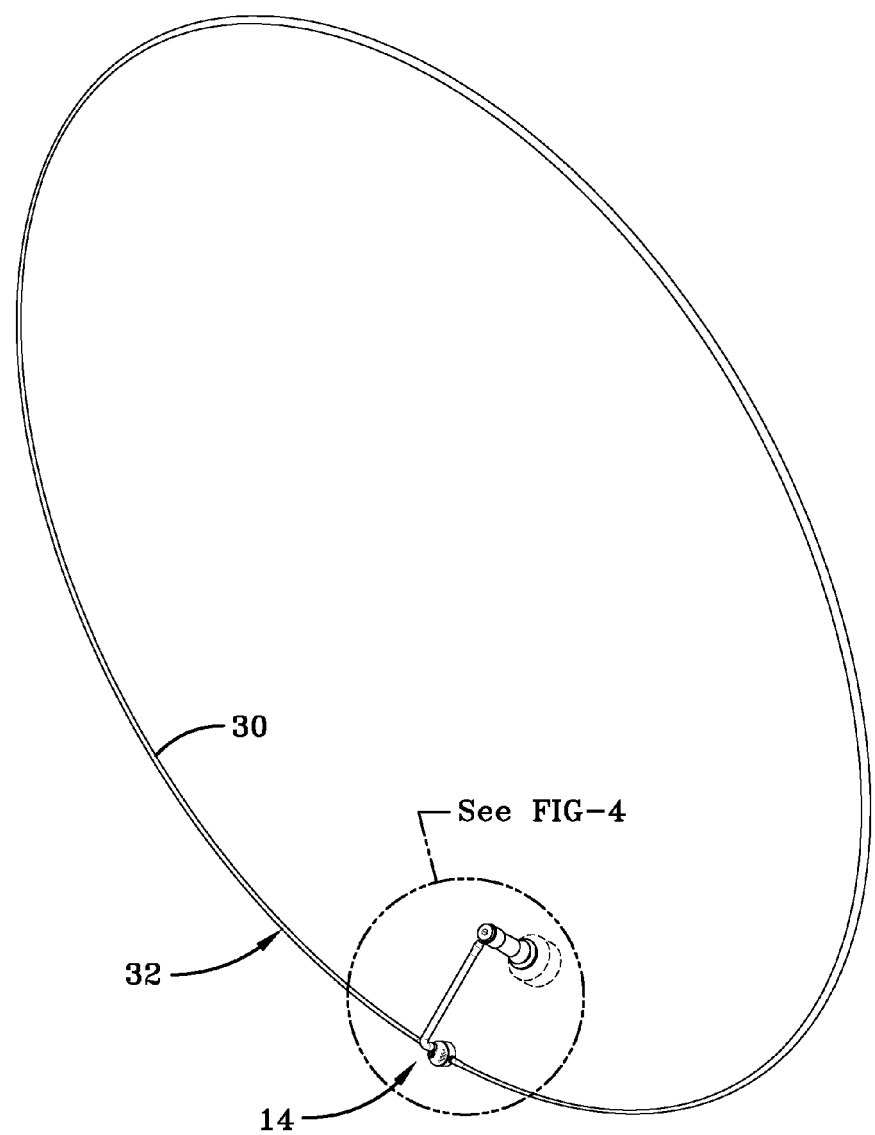
FIG. 3 is a perspective view showing an example pump sub-assembly, with the pump tube connection to AMT (air maintenance tire) valve stem regulator within the tire cavity.

As seen from FIGS. 2 and 3, the peristaltic pump assembly 14 may include an annular air tube 30 that encloses an annular passageway 32. The tube 30 may be formed of a resilient, flexible material, such as plastic or rubber compounds that are capable of withstanding repeated deformation cycles of the tire 12. So constructed, part of the tube 30 may deform within a tire 12 into a flattened condition subject to external force and, upon removal of such force, return to an original unflattened condition. In the example shown, the cross-section of the tube 30 in an unstressed state may be generally circular, but other alternative tube geometries may be employed. The tube 30 may have a diameter sufficient to operatively pass a requisite volume of air sufficient for the purpose of pumping air into the tire cavity 28 to maintain the tire 12 at a preferred inflation pressure.

The peristaltic principles of incorporating a deformable air tube within a tire are shown and described in U.S. Pat. No. 8,113,254, incorporated herein by reference in its entirety. In the example assembly 10, the tube 30 may be incorporated within an annular tire passageway formed within the tire proximate a tire bead region. As the tire 12 rotates, air from outside the tire may be admitted into the tube 30 and pumped along the air tube by the progressive squeezing of the tube within the tire as the tire rotates. Air is thus forced into an outlet valve and then into the tire cavity to maintain air pressure within the tire cavity at a desired pressure level.

The tube 30 may mount closely within a groove in the tire and may sequentially flatten as the tire rotates. The segment by segment flattening of the tube 30 as the tire 12 rotates may operate to pump air along the air passageway 32, air which is then directed into the tire cavity 28 to maintain the desired pressure level. A peristaltic pumping system employing a tube within a sidewall groove is also shown in U.S. Pat. No. 8,042,586, incorporated herein by reference in its entirety.

Figure 4:
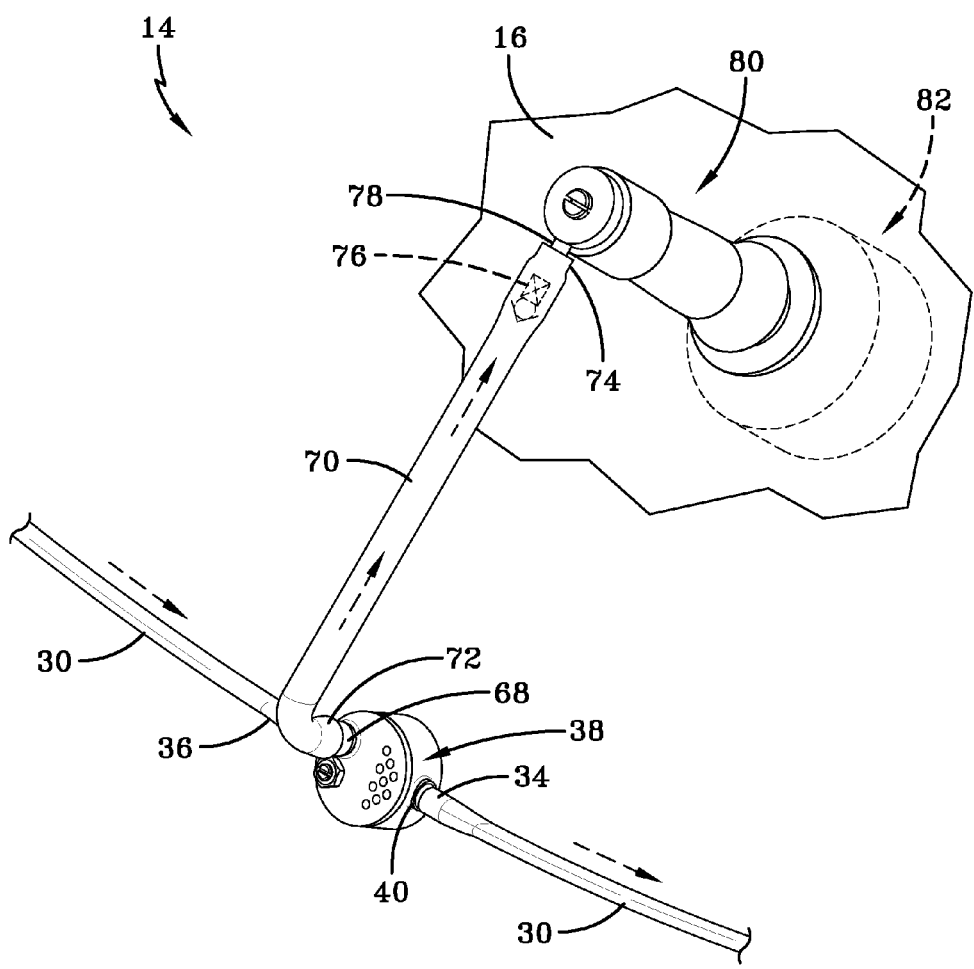
FIG. 4 is an enlarged fragmentary view taken from FIG. 3 showing a pump tube transfer housing and the tire AMT (air maintenance tire) valve stem regulator within the tire cavity.

Referring to FIGS. 3, 4, 5A, and 5B, the pump tube 30 may be generally annular and circumscribe a lower tire sidewall region proximate to a bead region. However, other configurations for the tube 30 may be devised. Opposite ends 34, 36 of the tube 30 may connect to a tube transfer housing 38. Frustro-conical tube ports 40, 42 may taper away from the tube housing 38, each having an internal axial air passageway 44, 46, respectively, which provide air passages into the tube housing. The tube ports 40, 42 may taper inward to a remote end and be received within ends of the tube 30, as shown in FIG. 4, to couple the tube 30 to the tube housing 38. The tube housing 38 may have cylindrical sides 50 and planar top and bottom panels 52, 54, respectively, defining a transfer housing internal chamber 48. The internal chamber 48 may be bifurcated into a tube transfer chamber 56 and a filter chamber 58 which may receive and house a porous filter component 60 therein.

The top panel 52 may enclose the chambers 56, 58. A relief valve 62 may be mounted to the top panel 52 and communicate with the transfer chamber 48. A one-way check valve 64 may mount to the top panel 52 adjacent the relief valve 62 and be in air flow communication with the transfer chamber 48. An array of through-apertures 66 may extend through the top panel 52, disposed over the transfer chamber 48, to facilitate an inflow of ambient air into the filter 60 and then into the air tube 30, as will be explained. The one-way valve 64 may extend through the panel 52 to a tapered port 68 to a valve stem regulator (FIG. 4).

Figure 6A:
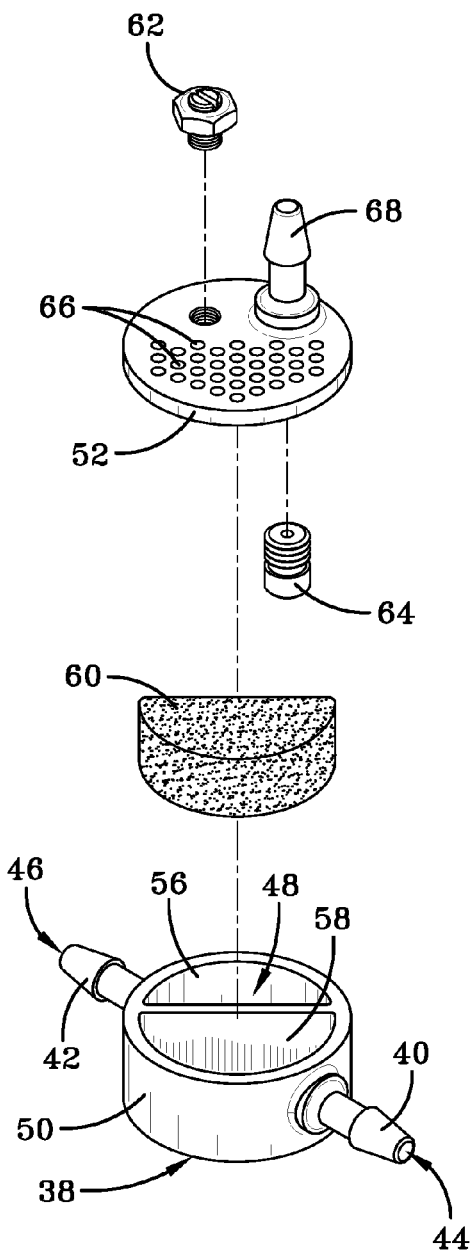
FIG. 6A is an exploded top perspective view of example pump tube transfer housing components.
Figure 6B:
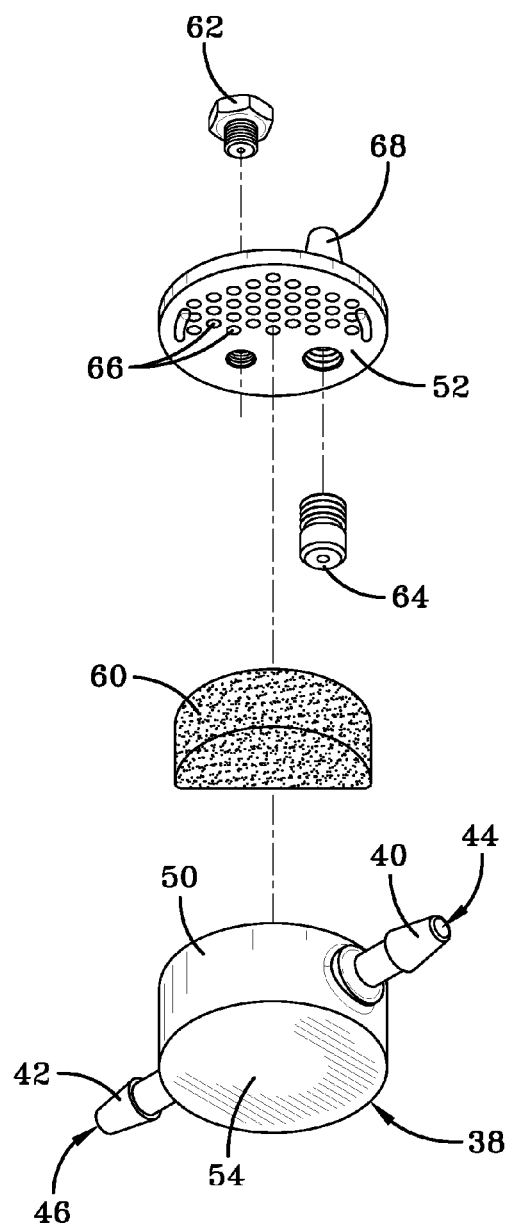
FIG. 6B is an exploded bottom perspective view of example pump tube transfer housing components.

Assembly of the transfer housing 48 and components may be understood from FIGS. 6A and 6B. The transfer housing 38 may receive the porous filter component 60 into the filter chamber 58. The one-way check valve 64 may be affixed through a sized aperture in the top panel 52 by screw thread engagement or other suitable assembly mechanism. The port 68 to the AMT valve stem regulator may attach to the check valve 64 and direct air from the check valve to a regulator. The relief valve 62 may mount to the top panel 52 by screw thread engagement or other suitable assembly mechanism. Thus assembled, the relief valve 62 and the one-way valve 64 may be in air flow communication with air within the transfer chamber 48. Air flow into the transfer chamber 48 may flow through the apertures 66 within the top panel 52.

Figure 5A:
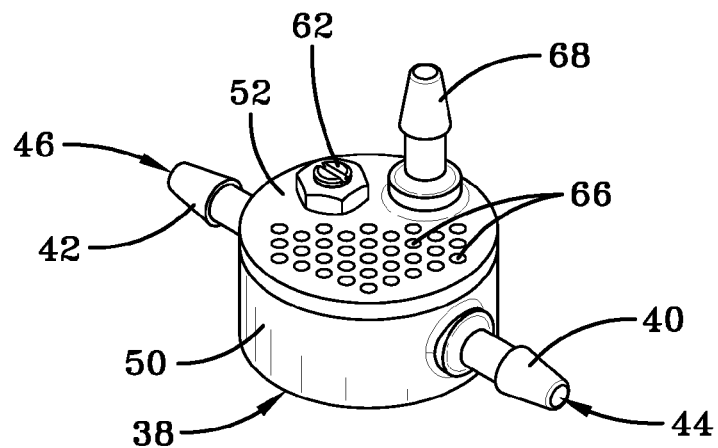
FIG. 5A is a perspective view of an example pump tube transfer housing assembly for use with the present invention.
Figure 5B:
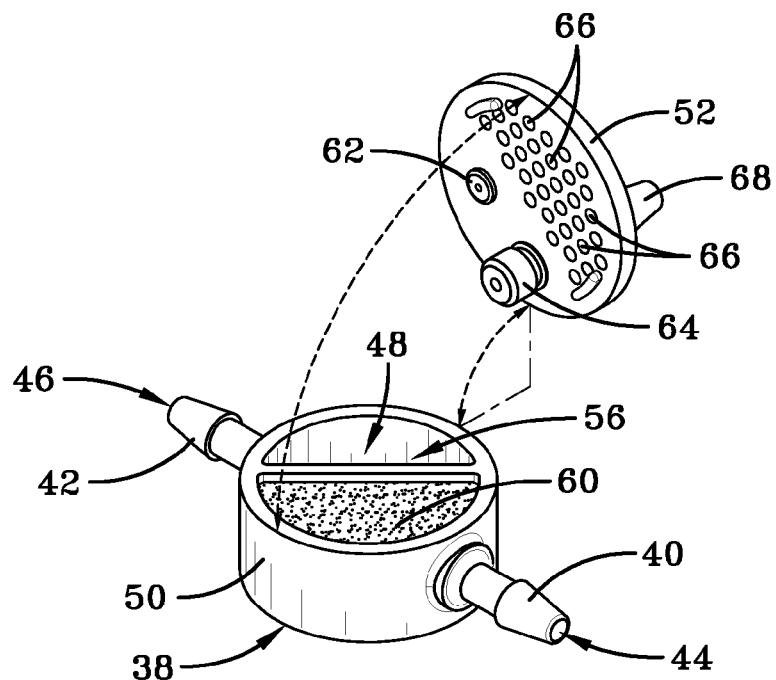
FIG. 5B is a perspective view of the example pump tube transfer housing of FIG. 5A with the cover tilted backward.

Referring to FIGS. 3, 4, and 5A, the tube 30 may connect opposite ends 34, 36 over the tube ports 40, 42 of the transfer housing 38. The port 68 to a valve stem 78 from the transfer housing 38 may be connected to an end 72 of an elongate connecting tube 70. An opposite end 74 of the connecting tube 70 may attach to the valve stem 78 to a tire valve stem 80. Seated within the valve stem 78 may be a one-way check valve 76 (FIG. 10) that opens and closes to admit air from the tube 30 into the tire valve stem 80.

Figure 7:
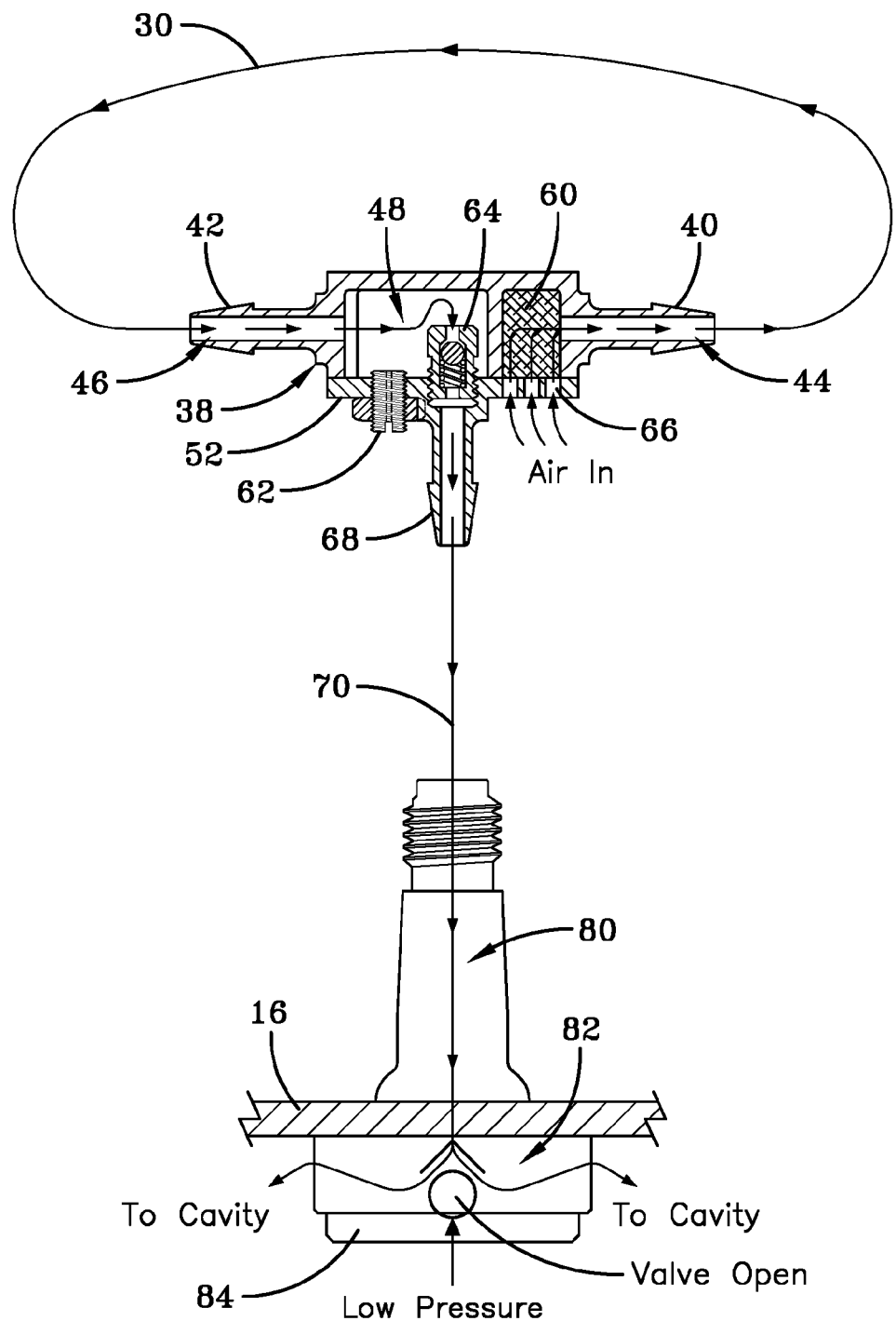
FIG. 7 is a schematic view showing air flow from atmosphere around the pump tube through the transfer housing to the AMT (air maintenance tire) valve stem regulator and then out to the tire cavity.
Figure 8:
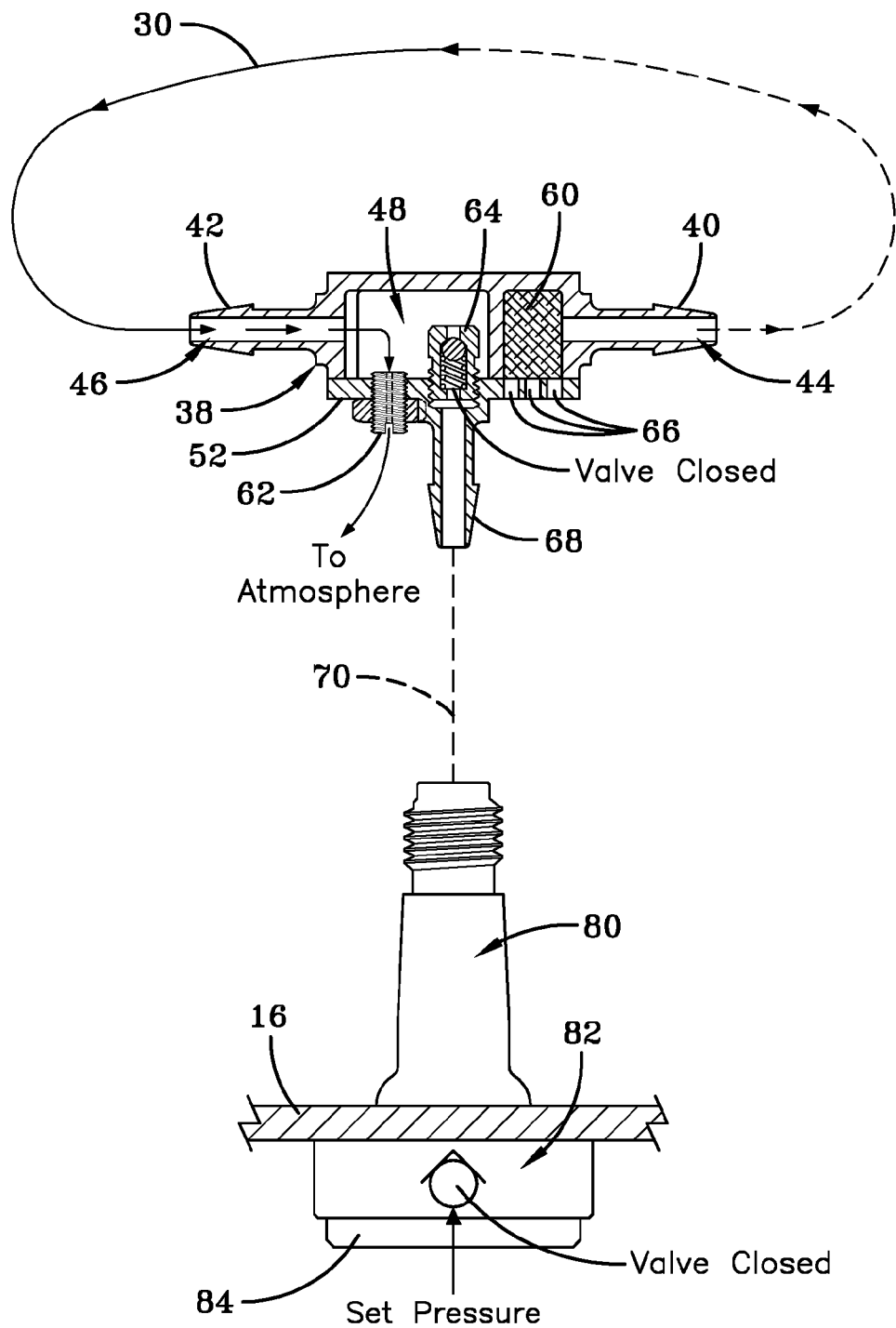
FIG. 8 is a schematic view where the tire cavity is at set pressure and the AMT (air maintenance tire) valve stem regulator is closed, forcing air in the transfer housing back out to atmosphere.
Figure 10:
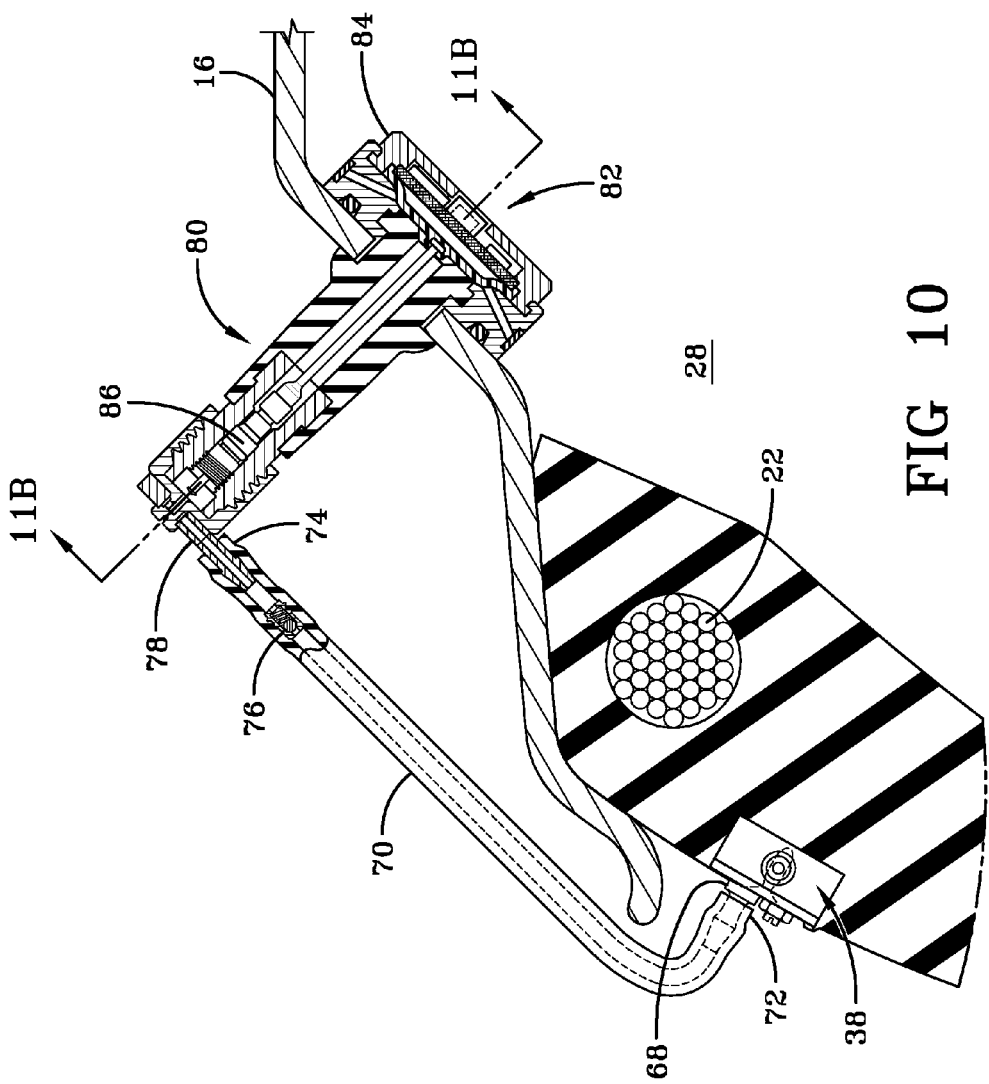
FIG. 10 is an enlarged fragmentary section view (taken from FIG. 2) showing the AMT (air maintenance tire) valve stem regulator mounted into a rim within the tire cavity and connected to the pump tube transfer housing.

FIGS. 7 and 8, respectively, show diagrams of the AMT system for the "open" condition in which air is pumped into the tire cavity 28, and for the "closed" position in which the cavity pressure is at the desired level. The AMT valve stem 80 may incorporate a pressure regulator assembly 82 at a lower or inward end (FIG. 10). The regulator assembly 82 may include a regulator housing 84 that opens and closes to place the AMT regulator assembly 82 in "open" and "closed" conditions. Thus, air may be admitted into the transfer housing 38, pass through the filter component 60, and be directed into the tube 30. The tube 30 may be incorporated into a groove within a tire sidewall (FIGS. 9A and 9B) and progressively and sequentially flattened by rotation of the tire 12 against a ground surface. Alternatively, the air passageway 32 may be encapsulated directly within a tire component, thereby eliminating use of the tube 30. In such an example configuration, the air passageway may pump air segment by segment as the tire 12 rotates, and the air passageway may be directly coupled at opposite ends to the transfer housing 48.

As the tire 12 continues to rotate along a ground surface, the tube 30 may be sequentially flattened, or squeezed, adjacent the tire footprint, segment by segment. The sequential flattening of the tube passageway 32, segment by segment (FIGS. 9A and 9B), may cause evacuated air from the flattened segments to be pumped, in the direction shown in FIGS. 7 and 8, to the transfer housing 38. When the air flow pressure is sufficient against the one-way valve 64, the one-way valve may open and allow air to flow through the outlet port 68 and into the connecting tube 70. Air may be directed by the connecting tube 70 to the AMT valve stem 80. The pressure regulator 82 may open (FIG. 7) when the air pressure within the tire 12 is lower than the set pressure, allowing air from the connecting tube 70 to pass through regulator 82 from the valve stem 80 and into the tire cavity 28. When air pressure within the tire cavity 28 is at or above the set pressure (FIG. 8), the regulator 82 may close and air may not be pumped from the transfer housing 38 into the connecting tube 70. Instead, pressurized air may be retained within the transfer chamber 48 until vented through the relief valve 62 to atmosphere.

Figures 11A, 11B:
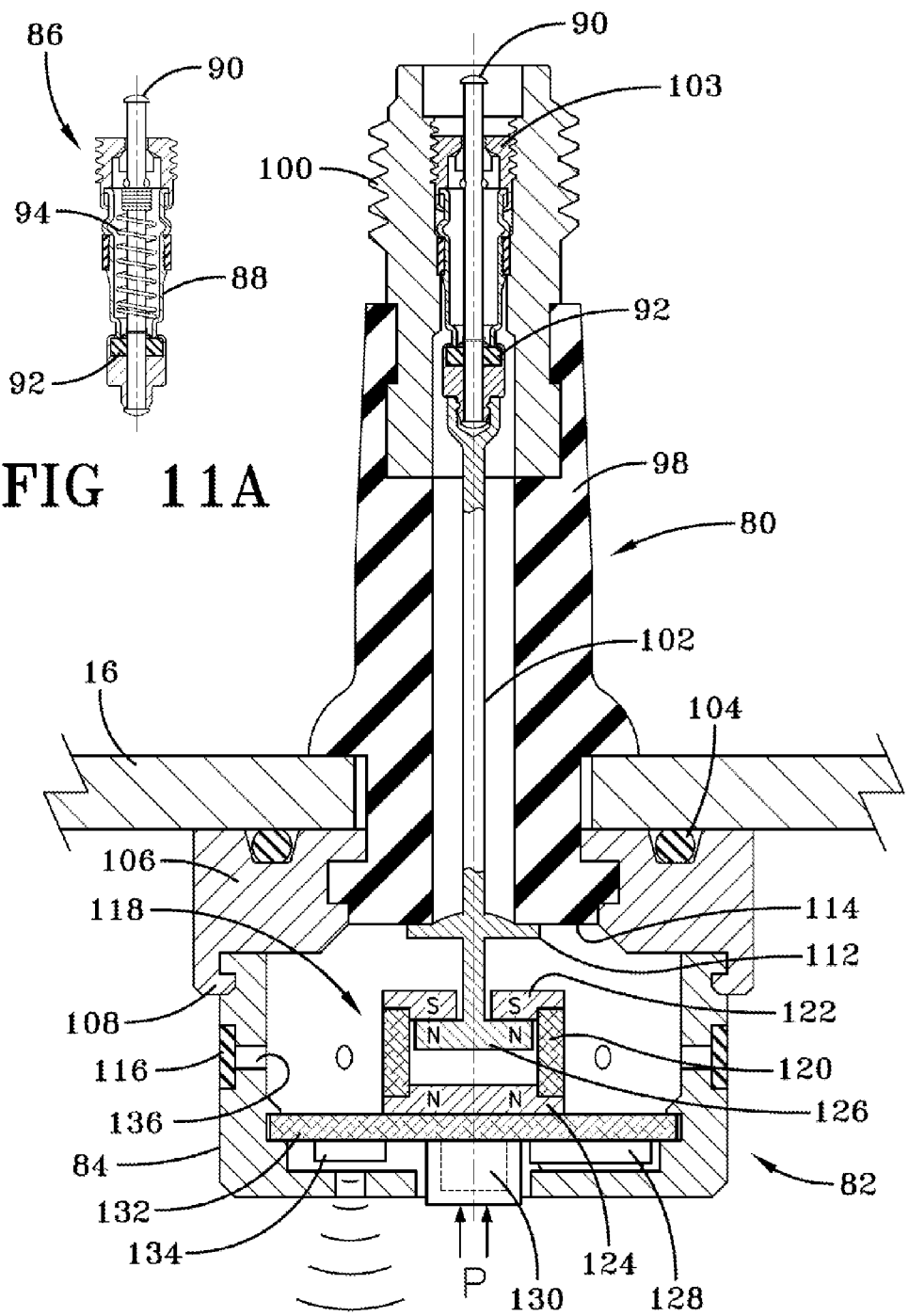
FIG. 11A is a section view of a standard Schrader valve core.
FIG. 11B is an enlarged section view (taken from FIG. 10) of the AMT (air maintenance tire) valve stem regulator components and modified valve core with the spring removed and connecting rod attachment to an electroactive polymer disk.

FIGS. 10, 11A, 11B, and 13 show the AMT valve stem 80 and regulator 82 in greater detail. In FIG. 11A, a conventional valve stem core 86 used for conventional inflation of tires is shown. The valve core 86, conventionally referred to as a "Schrader Valve Core", may include an elongate housing 88 through which a valve shaft 90 may extend. A valve seal component 92 may seat within the housing 88 and be coupled to the valve shaft 90. A biasing spring 94 may encircle the valve shaft 90 and bias the sealing component 92 within the housing 88 in an "up," or closed, position against the valve seal component 92. An air passageway through the valve stem core 86 may be biased in a closed position until the valve shaft 90 is depressed and the valve seal component 92 is moved to a "down," or open, position thereby allowing atmospheric air to enter the valve passageway 32 and be directed toward the tire cavity 28.

The valve stem core 86 may be modified in the subject AMT valve stem 80 by the removal of the biasing spring 94 (FIGS. 10, 11B, 12A, 12B and 13). The modified valve core 103 is seated within an externally screw threaded coupling collar 100. A coupling collar 100 may be received within, and retained by, a rubber sleeve 98 and projected outward. As used herein, "inward" and "outward" are used to designate directional orientation relative to the tire cavity 28; "inward" meaning toward the tire cavity and "outward" meaning away from the tire cavity. The coupling collar 100, the rubber sleeve 98, and the modified valve core 103 may constitute the valve stem 80 of the tire 12. A valve shaft 102 may extend along a through-passageway in the rubber sleeve 98. The rubber sleeve 98 may be retained within an aperture through the rim 16. The pressure regulator 82 may be housed within a regulator housing 84. The housing 84 may attach to the inward surface of the rim 16 by means of a mounting bracket 106. The rubber sleeve 98 from the valve stem 80 may extend through the rim 16 and attach at an inward end to the mounting bracket 106. The regulator housing 84 may be attached to an inward underside surface of the rim 16 by the mounting bracket 106. An O-ring 104 may be captured between the rim 16 and the mounting bracket 106 thereby sealing the interface between the mounting bracket 106 and the rim 16. The regulator housing 84 may couple to the mounting bracket 106 by means of interlocking flanges 108.

Figure 13:
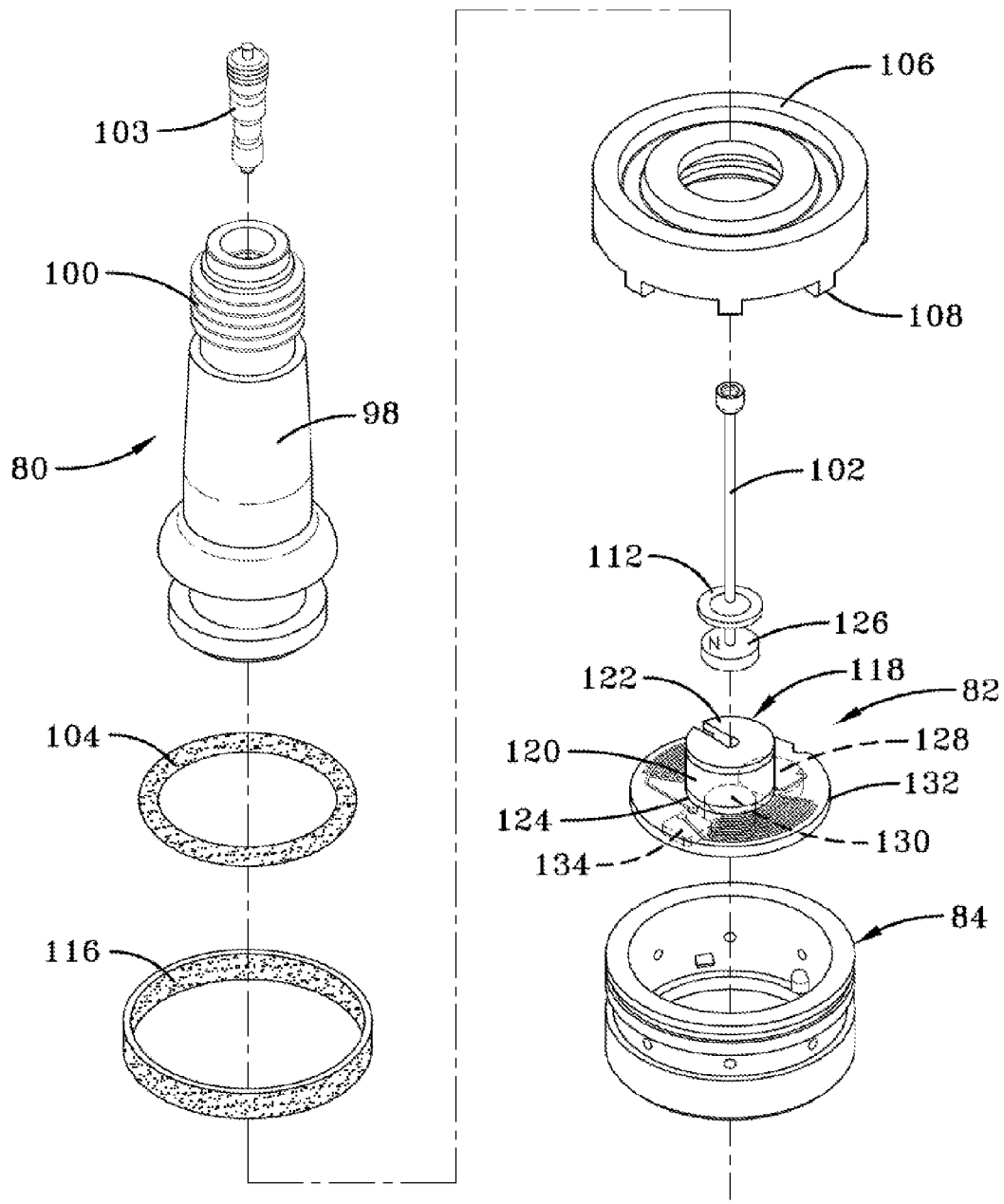
FIG. 13 is an exploded perspective view of example components for the AMT (air maintenance tire) valve stem regulator of FIG. 12A.

With reference to FIGS. 11B and 13, the pressure regulator 82 may be housed within the regulator housing 84. A backup seal component, such as a circular disk 112, may be affixed to the valve shaft 102 toward a lower, or inward, end. The circular disk 112 may redundantly back up against the bottom end 114 of the rubber sleeve 98. A sealing ring 116 of rubber or elastomeric composition may circumscribe, and seat within, an annular air flow opening 136 within the regulator housing 84. A magnetic switching device 118 may be supported by an electronic circuit board 132 within an insulator housing 120. Stationary poles 122, 124 of the switching device 118 may be mounted at opposite sides of the insulator housing 120 while moveable poles 126 may be affixed to a lower end of the valve shaft 102. The stationary poles 122, 124 may be electronically changed by a control signal, causing the moveable poles 126 on the valve shaft 102 to move reciprocally, or correspondingly, in an axial direction. Movement of the valve shaft 102, actuated by controlled attraction and repulsion of the moveable poles 126 to/from the stationary poles 122, 124, thereby causing the circular disk 112 to move in and out of sealing engagement against the passageway end 114. The through-passageway in the rubber sleeve 98 may thus be opened and closed to pressurized air flow by the operation of magnetic switching device 118. An energy harvester 128, a pressure sensing device 130, and a transmitter/receiver device 134 may be mounted to the underside of the electronic circuit board 132.

The pressure sensing device 130 may measure air pressure within the tire cavity 28 and transmitter/receiver device 134 may send a control signal to the magnetic switching device 118 which, in a low tire cavity pressure condition, may switch the system into an "open" configuration, allowing pressurized air to pass through the through-passageway of the valve stem 80 and into the regulator housing 84. The pressurized air may then cause the sealing ring 116 to swing open, allowing the pressurized air within the regulator housing 84 to enter the tire cavity 28. When the air pressure is at or above the set pressure, the pressure sensing device 130 may cause the control signal from transmitter/receiver device 134 to the magnetic switching device 118 and move the magnetic switching device 118 into a closed position. In the closed position, the valve shaft 102 may be moved axially outward, re-establishing the seal of the circular disk 112 against the lower end 114 of the through-passageway.

FIGS. 12A and 12B, respectively, show the valve stem 80 in closed and open positions. When the pressure in the tire cavity 28 is at or above the set pressure, the pressure sensing device 130 may detects that the tire 12 is fully inflated. The fully inflated signal from the transmitter/receiver device 134 may be sent to a data collection and/or display processor for informing a vehicle user of a fully inflated tire state. The magnetic switching device 118 may be placed in an off position by polarity of the magnetic poles 122, 124, 126. Movement of the moveable poles 126 upward to the opposite poles 122 may cause the valve shaft 90 to move axially upward, placing the circular disk 112 against the lower end of the rubber sleeve 98 and closing off air flow from the tube 30 (FIG. 8). The ring seal 116 may form a tight, non-stressed seal against the regulator housing annular gap 136 and air may not flow into the tire cavity 28. The redundant seals achieved by the circular disk 112 and the ring seal 116 in the closed position may act to insure that air flow into the tire cavity 28, in the fully inflated tire state, will not occur. The air pumped from the tube 30 (FIG. 8) may be passed from the transfer chamber 48 of the transfer housing 38 to the atmosphere by way of the relief valve 62. The pumping of air by the tire based tube 30 may thus continue with the air directed to atmosphere instead of into the tire cavity 28.

If air pressure within the tire cavity 28 falls below the set pressure, the regulator 80 may switch to the open condition indicated by FIGS. 7 and 12B. Air from the tube 30 may pass from the transfer housing 38 into the connecting tube 70 as the valve stem 80 switches to the open condition. The low pressure condition may be sensed by the pressure sensing device 130 and a low pressure signal may be sent by transmitter/receiver device 134 to the data processor and vehicle user alert display. The polarity of the magnetic switching device 118 and the stationary poles 122, 124 may be reversed such that the lower moveable poles 126 move axially downward. Downward movement of the valve shaft 90 may move the backup circular disk 112 out of sealing engagement with the lower end of the rubber sleeve 98, thereby allowing pressurized air to flow down the through passageway into the internal cavity of housings 106, 111. The pressurized air may force the ring seal 116 to resiliently flex outward at a lower end, thus opening the annular gap 136 between the housings 106, 111. Pressurized air may flow through the gap 136 and into the tire cavity 28 to bring the cavity pressure up to the set pressure. The air from the tube 30, with the regulator assembly 82 in the open position of FIG. 12B, may flow (FIG. 7) into the connecting tube 70 to the modified AMT valve stem 80.

It will be appreciated that valve shaft 102 thus may move axially up and down reciprocally responsive to the open and closed position of the magnetic switching device 118. The axial position of valve shaft 102, in turn, may open and close the air passage path through the valve stem 80. The air pressure from pumped air entering the regulator may open and close the ring seal 116 to thereby open and close the flow of pumped air into the tire cavity 28. In the raised shaft position of 102 in FIG. 11B, the regulator valve is closed. Air from the tube 30 may only be allowed to pass from the transfer housing 38 into the connecting tube 70 as the regulator 82 switches magnetic poles to the open condition.

Figure 14:
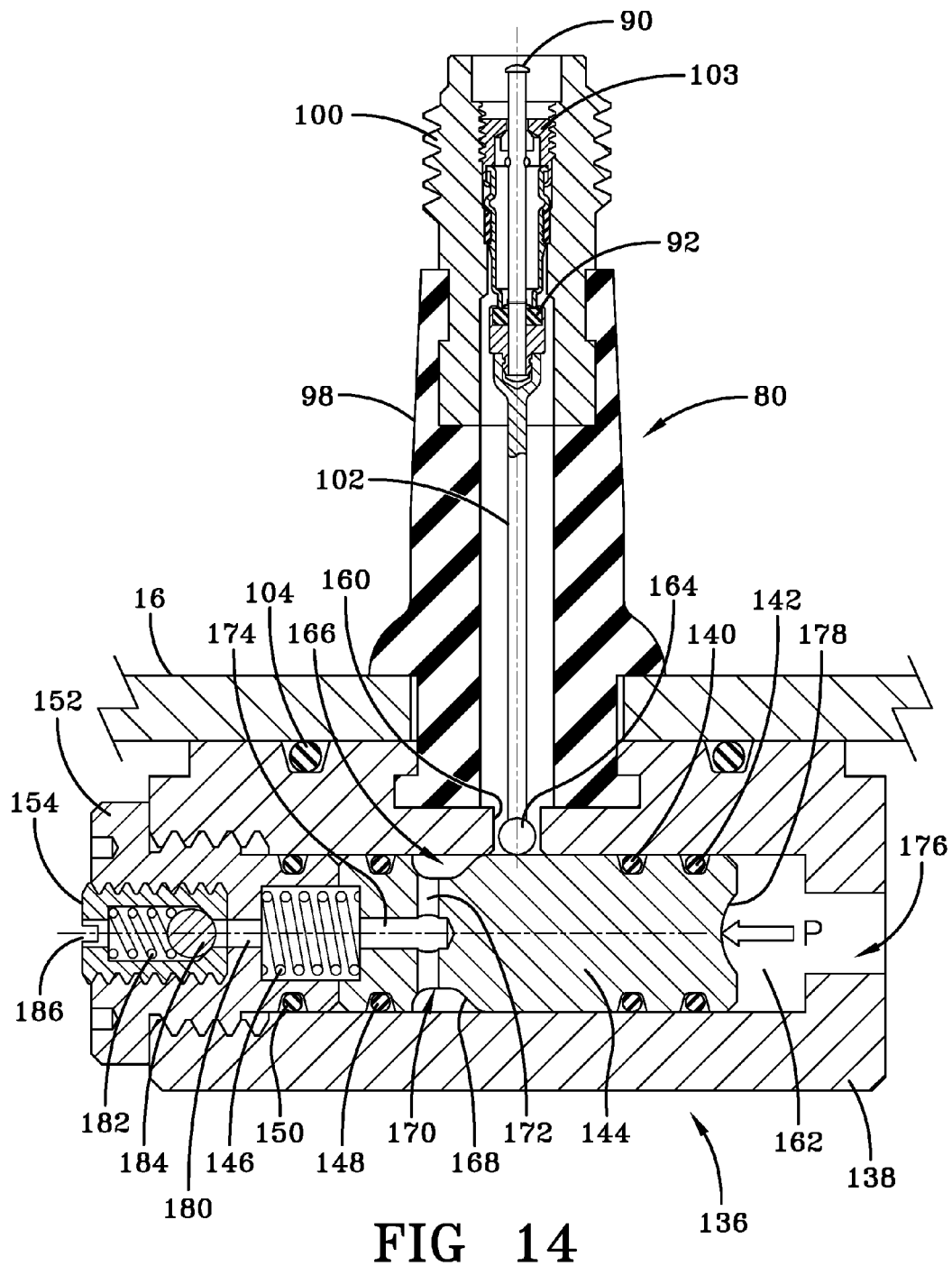
FIG. 14 is a section view showing another example rim-mounted AMT (air maintenance tire) valve stem regulator.
Figure 15:
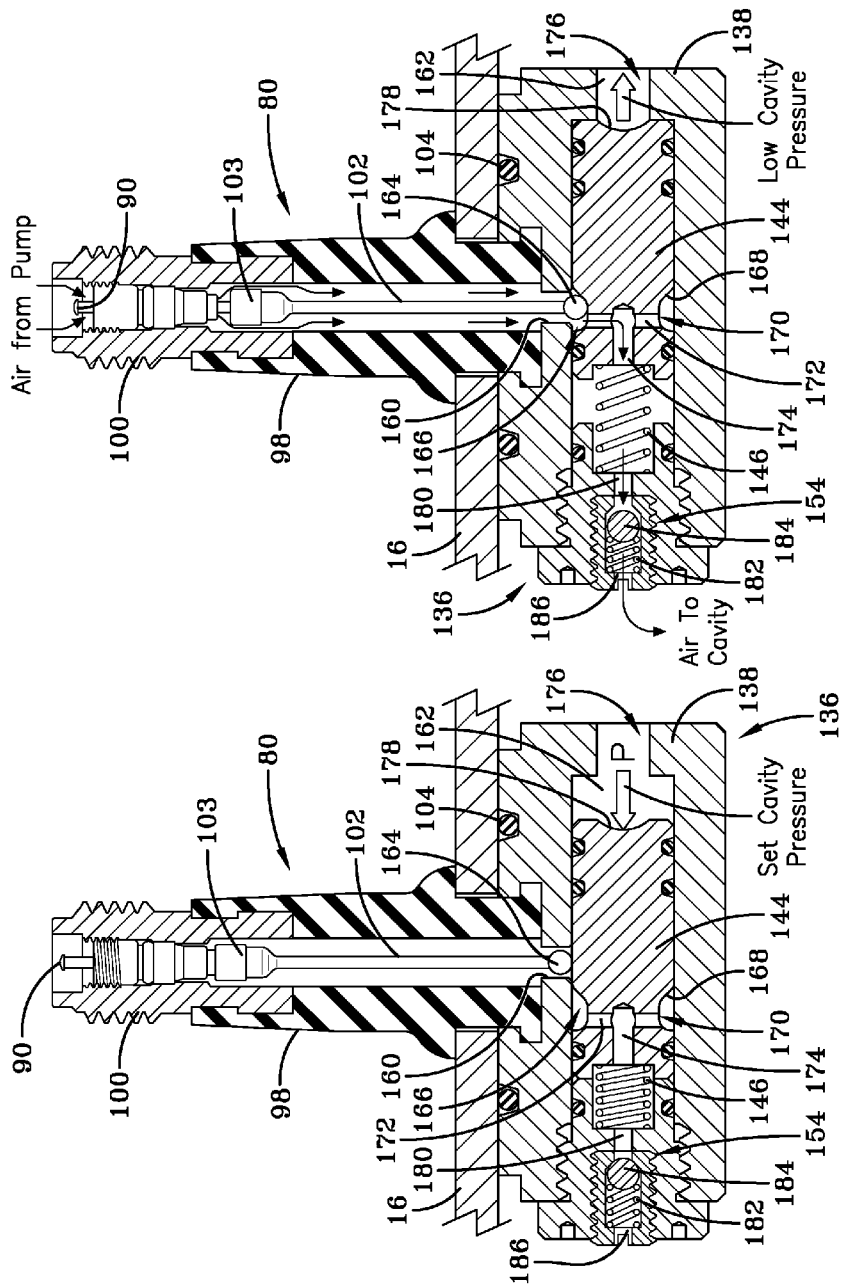
FIG. 15A is a section view of the AMT (air maintenance tire) valve stem regulator of FIG. 14 shown with the tire cavity at set pressure and the valve core closed.
FIG. 15B is a section view of the AMT (air maintenance tire) valve stem regulator of FIG. 14 shown in a low tire cavity pressure state with the valve core open.
Figure 16:
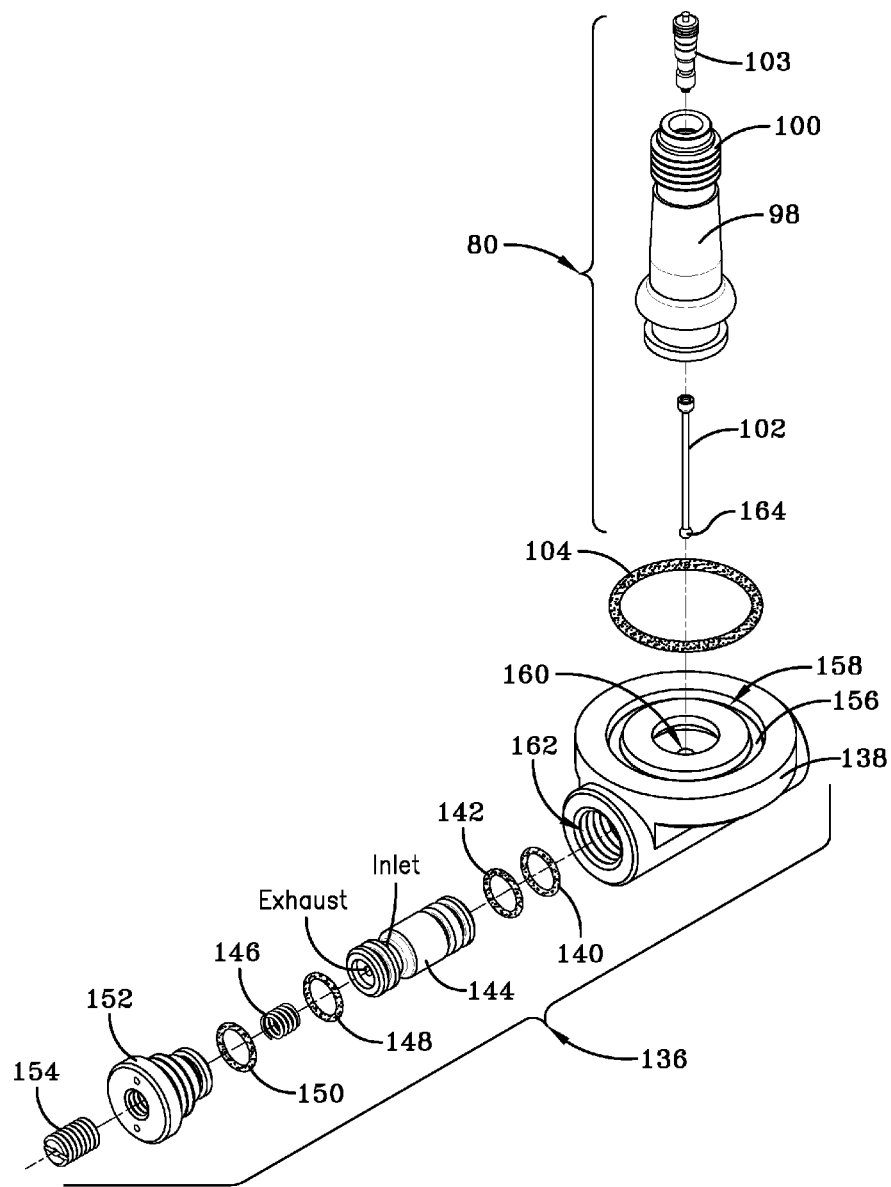
FIG. 16 is an exploded perspective view of example components for the AMT (air maintenance tire) valve stem regulator of FIG. 14.

FIG. 14 is a sectional view of an alternative rim-mounted AMT regulator 136 that couples to the AMT valve stem 80 modified from a Schrader valve as discussed and described above. FIG. 15A is a sectional view of the alternative AMT valve stem regulator 136 shown with the tire cavity 28 at the set pressure and the valve core closed. FIG. 15B is a sectional view of the alternative AMT valve stem regulator 136 shown in a low tire cavity pressure state, with the valve core open. FIG. 16 is an exploded perspective view of the alternative AMT valve stem regulator 136.

With reference to FIGS. 14, 15A, 15B and 16, the alternative regulator 136 may include an elongate regulator housing 138, first and second sealing O-rings 140, 142, an elongate cylindrical piston 144, a biasing spring 146, third and fourth sealing O-rings 148, 150, an exhaust head 152, and a one-way check valve 154. The regulator housing 138 may include an annular rim seal seat 156 within a circular top mounting surface 158 and downwardly oriented shaft passageway 160 extending into a piston seating elongate chamber 162 horizontally disposed within the interior of the regulator housing 138. The valve stem 80, as with the example of FIGS. 11A, 11B, may include a rubber sleeve 98, or boot, a threaded collar 100, and a modified valve core 103 positioned within the threaded collar 100 and axially aligned with a central passageway down along the valve stem 80. The modified valve core 103 may be modified by removing a biasing spring. The modified valve core 103 may be coupled to the elongate valve shaft 102. The valve shaft 102 may provide a sealing ball protrusion 164 at an inward end.

The cylindrical piston 144 may be seated within the piston chamber 162 of regulator housing 138, reciprocally moving axially between the closed and open conditions shown in FIGS. 15A and 15B, respectively. The piston body may have an annular detent groove 166 extending into an outer surface. The detent groove 166 may be defined by a rearward declining surface 168 sloping downward and forward to a bottom groove seat 170 at a forward end of the detent groove 166. The piston body may further have annular seal-receiving grooves for receiving the O-rings 140, 142, 148, the O-rings abutting the sidewall defined piston chamber 162. A transversely extending air passageway 172 may extend from the groove seat 170 to an exhaust axial passageway 174 within the piston body. The air passageway 174 may extend through the piston body to a forward piston end. A rearward end 178 of the piston 144 may be exposed to the air pressure within the tire cavity 28 by means of a rearward opening 176 within the piston housing 138. Positioned within the piston chamber 162, the piston 144 may reciprocally move axially within the piston chamber 162 responsive to the tire cavity pressure P, as shown in FIGS. 15A and 15B and explained below.

The exhaust head 152 may receive an O-ring within an annular groove and screw threads into a forward end of the regulator housing 138. The biasing spring 146 may be seated within an inward positioned end of the exhaust head 152 and compress against a forward end surface of the piston 144. The one-way ball check valve 154 may be housed within the exhaust head 152 and positioned in front of the biasing spring 146. An axial air passage 180 may extend through the exhaust head 152 to an exhaust port 186. In the assembled condition illustrated in FIGS. 14, 15A, 15B, the air passage 180 of the exhaust head 152 may align axially with the piston air passageway 174. In the assembled condition, as shown in FIG. 14, 15A, 15B, the regulator 136 may mounts to an underside of the rim 16 with an elongate axis of the regulator assembly oriented tangential to the underside mounting surface of the rim and perpendicular to the longitudinal axis of the elongate valve stem 80. So positioned, axial movement of the piston 144 may be directionally perpendicular to the longitudinal axis of the valve stem 80.

FIGS. 15A and 15B, respectively, show the valve and regulator in the closed and open positions. In FIG. 15A, the tire cavity 28 is at the set pressure P forcing the piston 144 against the compressed biasing spring 146. So positioned, the piston 144 may be axially in a relatively forward location within the piston chamber 162. In the open condition, the ball protrusion 164 of the valve shaft 102 from the modified valve core 103 may impinge upon an outward surface of the piston 144. Air within the valve stem passageway may thus be blocked from exiting by the piston 144. In the closed position, the valve shaft 102 may be in an axially outward orientation within the valve stem 80.

In the closed position of FIG. 15A, air pumped from the tube 30 (FIG. 7) is blocked from entering the AMT valve stem 80. The pumped air is thus directed from the transfer chamber 48 of the transfer housing 38 to the atmosphere by way of the relief valve 62. The pumping of air by the tube 30 thus continues unabated, but the air from the tube is directed to atmosphere instead of into the tire cavity 28.

If the air pressure within the tire cavity 28 falls below the set pressure, the regulator 82 may switch to the open position indicated by FIG. 15B. The low cavity pressure may cause biasing spring 146 to expand against the forward end of the piston 144, causing the piston to move axially to the rear of the regulator housing 138. When the piston 144 has moved to a sufficient extent, the groove 166 of the piston may move into alignment with the air passage through the valve stem 80. The ball protrusion 164 at the end of the valve shaft 102 may be thus freed to fall through the opening 160 and onto the sloped surface 168. The ball protrusion 164 of the valve shaft 102 may ride the sloped surface 168 into the groove seat 170. An air flow from the tube 30 may be established by the relocation of the ball protrusion 164. The air flow path may extend down through the valve stem 80 into the transverse passageway 172. The air flow path may conduct pressurized air flow from the passageway 172 into the axial passageway 174 of the piston 144. Air pressure may be applied against the ball 184 of the one-way check valve 154 within the exhaust head 152. The pressurized air may move the ball 184 laterally, overcoming the compression force of biasing spring 182 and opening the one-way check valve 154 to air flow therethrough. Air is thereby directed through the one-way check valve 154 and out of the exhaust head passageway 186 and into the tire cavity 28.

Once air pressure in the tire cavity 28 has been restored to the desired set pressure P, the piston 144 may be forced axially into the closed position of FIG. 15A, with the ball protrusion 164 of the valve shaft 102 riding the sloped surface 168 out of the piston annular groove 166. The ball protrusion 164 of the valve shaft 102, in the closed position of FIG. 15A, may block off the air passageway opening 160 at the base of the valve shaft 102. It may be noted that a redundant closure to the passing of pressurized air is created by the piston 144 moving out of alignment with the valve stem air passageway and by the simultaneous movement of the ball protrusion 164 into a sealing engagement with the inward end of the valve stem air passageway. It will be appreciated that valve shaft 102 may move axially up and down reciprocally responsive to lateral reciprocal sliding movement of the piston 144 within the piston chamber 162 of the regulator housing 138 thereby opening and closing the air passage opening 160 of the valve stem 80 and opening and closing air flow through the regulator 136 to the tire cavity 28. The piston 144, ball valve 154, and ball protrusion 164 accordingly represent a valve system for effectively closing and opening air flow into the tire cavity 28. In the raised shaft position of FIG. 15A, the valve system of the regulator 136 is closed. Air from the tube 30 is only allowed to pass from the transfer housing 38 into the connecting tube 70 after the regulator 136 switches to the open position.

From the foregoing, it will be understood that FIGS. 1 through 13 illustrate an example magnetic valve for use with the present invention in which signals from the transmitter/receiver device 134, taken from the pressure measurement device 130, may control the opening and closing of a magnetic switching device 118. Pressure levels within the tire cavity 28 may thus be controlled. In the example of FIGS. 14 through 16, a mechanical valve system may constitute a piston 144, check valve 184, and ball protrusion 164 and control the flow of pressurized air into the tire cavity 28. Pressurized air may be generated by sequential collapse of a tube 30 within a tire sidewall 18 as the tire 12 rolls against a ground surface. The pressurized air is routed through the transfer housing 38 and directed by the connecting tube 70 to the tire valve stem 80 and, by operation of a regulator 82 or 136, to the tire cavity 28 when the tire cavity pressure falls below the set pressure level. If the pressure within tire cavity 28 is at or above the set pressure, pressurized air from the tube 30 may be vented to the atmosphere until needed should the tire pressure within the tire 28 cavity fall below the set pressure.

Both of the above examples may utilize a valve stem 80 of a tire in conjunction with a regulator 82 or 136. The examples may use a conventional Schrader valve 86 and remove the spring 94 from inside of it. The valve 86 may be sealed with a spring 94 loaded action connected to the valve stem 80. The biasing of spring 94 must be overcome with some pressure, usually provided by the stem in an air chuck, to allow the flow of air into the tire 12. The example system may remove the spring 94 from the valve core, effectively making the valve shaft 90 free to move axially. The valve stem 80 may be connected through an inward length 102 of the valve shaft 90 to the pressure regulator (82 or 136) of either the FIG. 13 example or the FIG. 14 example. In particular, the inward portion of the valve shaft 102 of the modified valve may be located within the air passageway through the valve stem 80. The valve shaft 102 may be a linkage to the pressure regulator 82 or 136. In the example of FIGS. 1 through 13, an electrically powered regulator pressure sensing device 130 may be employed, connecting to the valve shaft 102 inside the valve stem 80. The pressure sensing device 130 in the regulator 82 may measure cavity pressure and control, by signal transmission, a magnetic switching device 118 to modulate the opening and closing of the valve shaft 102. In the example of FIGS. 14 and 15, the valve shaft 102 may be coupled to the piston 144 through the ball protrusion 164.

One or both of the tire sidewalls 18 may have an elongate sidewall groove formed therein in which an elongate tube 30 may be encased. The tube 30 may have an internal air passageway 32 operatively located to compress segment by segment from an expanded diameter to a substantially reduced diameter responsive to a bending strain introduced into the first sidewall from a rolling tire footprint. A connecting tube 70 may extend between the air tube 30 and the valve stem 80, the connecting tube having an internal connecting air passageway for directing air forced along the air tube air passageway into the internal valve stem passageway as the tire 12 rolls over a ground surface. The assembly may include a transfer housing 38 coupling the connecting tube 70 with the air tube 30. A check valve 76 may be positioned within the connecting tube 70 to prevent air from the AMT valve stem 80 from flowing backward from the tire cavity 28 to the transfer housing 38. A further one-way check valve 64 may mount to the transfer housing 38 to likewise prevent air from flowing back from the downstream tire cavity 28. The transfer housing 38 may further have a relief valve 62 operative to evacuate air from the transfer housing when an air pressure within the tire cavity 28 exceeds the set pressure. The AMT valve stem 80, in an open position, may pass pressurized air from the connecting tube 70 through the axial passageway of the valve stem 80, through the system regulator 82 or 136 and into the tire cavity 28. In the closed position, the regulator 82 or 136 may prevent the passage of such air into the tire cavity 28.

Figure 17:
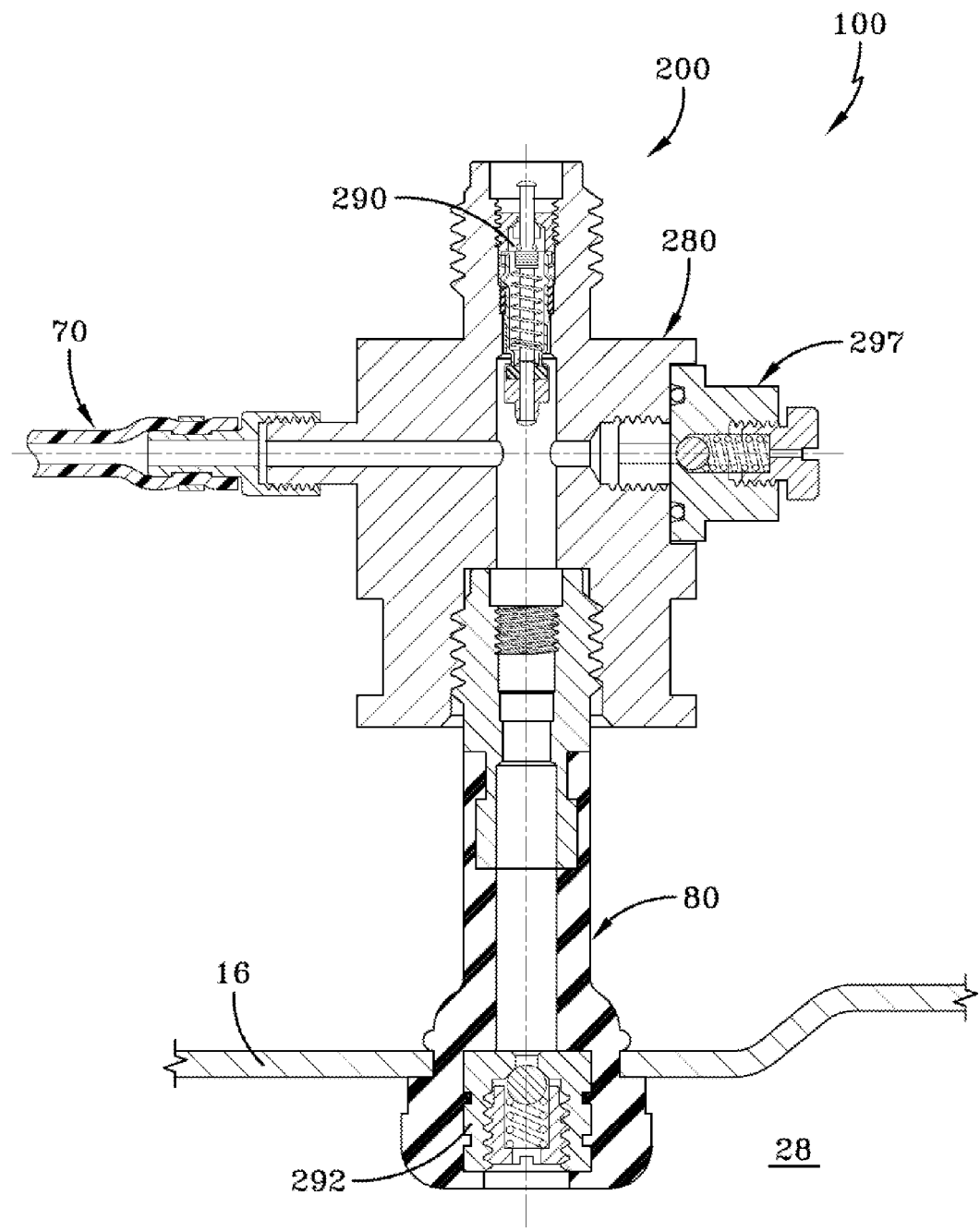
FIG. 17 is a schematic sectional view of a pressure control assembly external to the tire cavity in accordance with the present invention.

In accordance with the present invention, the example tire assembly 10 may include a pressure control assembly 200 external to the tire cavity 28 (FIG. 17). The connecting tube 70 may pump pressurized air directly into a valve housing 280 of the pressure control assembly 200. The valve housing 280 may threadedly attach to a standard valve stem, such as 80. The valve housing 280 may have a fill port and a check valve 290 for manual addition of pressurized air to the tire cavity 28. The base of the valve stem 80 may also have a check valve 292 located inside the tire cavity 28 for preventing pressurized air from flowing out of the tire cavity and into the pressure control assembly 200. The valve housing 280 may further have a relief valve 297 for relieving air received by the valve housing 280 from the connecting tube 70 at pressures higher than the set pressure P.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:
1. An air maintenance tire assembly comprising:
 a tire having a tire cavity bounded by first and second sidewalls extending to a tire tread region;
 a pressure control assembly attached to an elongate valve stem projecting from a rim, the pressure control assem- bly being external to the tire cavity, the elongate valve stem projecting outward from the tire cavity and operative to admit pressurized air into the tire cavity through the pressure control assembly, the first sidewall having an elongate sidewall air passageway therein operatively located to compress segment by segment from an expanded diameter to a substantially reduced diameter responsive to a bending strain introduced into the first sidewall from a rolling tire footprint thereby forcing air, segment by segment, along the air passageway; and a connecting tube connected to the air passageway and the pressure control assembly, the connecting tube operative to sequentially direct air forced along the air passageway, first, into the pressure control assembly and, then, into the elongate valve stem as the tire rolls over a ground surface.

2. The air maintenance tire assembly set forth in claim 1 wherein the pressure control assembly includes a valve housing threadedly attached to the elongate valve stem.

3. The air maintenance tire assembly set forth in claim 2 wherein the pressure control assembly includes a relief valve for relieving pressure in the valve housing above a set pressure.

4. The air maintenance tire assembly set forth in claim 3 wherein the connecting tube is coupled in air flow communication with the air passageway and the valve stem.

5. The air maintenance tire assembly set forth in claim 4 further comprising a first valve means for enabling and disabling a flow of pressurized air into the connecting tube from the air passageway.

6. The air maintenance tire assembly set forth in claim 5 wherein the first valve means comprises a one-way valve housed within a transfer housing, the transfer housing coupling the connecting tube with the air passageway.

7. The air maintenance tire assembly set forth in claim 6 further including a second valve means comprising the pressure control assembly and the elongate valve stem.

8. The air maintenance tire assembly set forth in claim 7 wherein the air passageway and sidewall groove are substantially annular and reside within the first sidewall proximate to the valve stem.

9. The air maintenance tire assembly set forth in claim 7 wherein the pressure control assembly opens responsive to an air pressure within the tire cavity falling below the set pressure and closes responsive to air pressure within the valve housing at or above the set pressure.

10. The air maintenance tire assembly set forth in claim 9 wherein the relief valve opens at pressures above a recommended inflation pressure of the tire.

11. A method of maintaining air within a tire comprising the steps of:

positioning within a sidewall an elongate air passageway, the tire having an elongate valve stem projecting outward from a tire cavity;

locating the air passageway operative to compress, segment by segment, from an expanded diameter to a substantially reduced diameter responsive to a bending strain introduced into a sidewall from a rolling tire footprint of the tire thereby forcing air, segment by segment, along the air passageway; and extending a connecting tube between the air passageway and a pressure control assembly threadedly attached to the valve stem, the connecting tube operative to sequentially direct air forced along the air passageway, first, into the pressure control assembly and then the valve stem and tire cavity as the tire rolls over a ground surface.

12. The method as set forth in claim 11 further comprising the step of:

deploying the air passageway as an elongate air tube within a groove formed within the sidewall.

* * * * *